United States Patent
Hamanaka et al.

(10) Patent No.: US 12,457,091 B2
(45) Date of Patent: Oct. 28, 2025

(54) CONTROL AND MONITORING SIGNAL TRANSMISSION SYSTEM

(71) Applicant: ANYWIRE CORPORATION, Kyoto (JP)

(72) Inventors: Junichi Hamanaka, Kyoto (JP); Yasunori Tanaka, Kyoto (JP); Tsutomu Sugaya, Kyoto (JP)

(73) Assignee: ANYWIRE CORPORATION, Kyoto (JP)

( * ) Notice: Subject to any disclaimer, the term of this patent is extended or adjusted under 35 U.S.C. 154(b) by 0 days.

(21) Appl. No.: 18/713,733

(22) PCT Filed: Dec. 6, 2021

(86) PCT No.: PCT/JP2021/044635
§ 371 (c)(1),
(2) Date: May 28, 2024

(87) PCT Pub. No.: WO2023/105554
PCT Pub. Date: Jun. 15, 2023

(65) Prior Publication Data
US 2025/0030532 A1    Jan. 23, 2025

(51) Int. Cl.
*H04L 7/00*    (2006.01)
*H04L 7/04*    (2006.01)

(52) U.S. Cl.
CPC ............ *H04L 7/0087* (2013.01); *H04L 7/042* (2013.01)

(58) Field of Classification Search
CPC ....... H04L 1/0061; H04L 1/08; H04L 7/0087; H04L 1/20; H04L 7/042; H04L 12/40176;
(Continued)

(56) References Cited

U.S. PATENT DOCUMENTS 8,156,251 B1 *   4/2012   Sorensen ................ G06F 11/27
                                                                 710/2
9,952,995 B2 *   4/2018   Rahamim ............... G06F 13/24
(Continued)

FOREIGN PATENT DOCUMENTS

JP        5738498 B1     6/2015

OTHER PUBLICATIONS

International Search Report issued in Patent Application No. PCT/JP2021/044635 dated Jan. 25, 2022.

*Primary Examiner* — Dac V Ha
(74) *Attorney, Agent, or Firm* — MCDONALD HOPKINS LLC

(57) ABSTRACT

In a control and monitoring signal transmission system according to the present invention, a master station that transmits and receives data to and from a control unit, a plurality of remote stations that transmit and receive data to and from the master station by a transmission synchronization method via a common transmission line, and a terminator that is connected to the common transmission line are provided, and transmitting and receiving data between the master station and the remote stations is performed by superimposing data on a frame repeatedly transmitted from the master station. The terminator extracts all of the monitoring data transmitted from the remote stations, converts the monitoring data into check data by a predetermined rule, and superimposes the check data on a check data output range provided at the end of the frame. The master station converts all of the monitoring data transmitted from the remote stations into the comparison data by the same rule as the terminator, and determines that there is an error in the transmission data when the comparison result of the check data and the comparison data is inconsistent between the check data and the comparison data.

5 Claims, 7 Drawing Sheets

(58) Field of Classification Search
CPC ............. H04L 12/4035; H04L 43/0823; H04L 43/0847; H04L 43/16; G01R 19/16566; G05B 23/0262; H04Q 9/00; Y02E 60/00; Y04S 10/16

See application file for complete search history.

(56) References Cited

U.S. PATENT DOCUMENTS

| | | | |
|---|---|---|---|
| 10,116,542 B2 * | 10/2018 | Takahashi | H04L 1/0061 |
| 2019/0116477 A1 * | 4/2019 | Bhagwani | H04W 4/50 |

* cited by examiner

CONTROL AND MONITORING SIGNAL TRANSMISSION SYSTEM

TECHNICAL FIELD

The present invention relates to a control and monitoring signal transmission system wherein a signal line between a master station provided on a control side and a plurality of remote stations provided on a controlled side is reduced in wiring, connected by a common transmission line, and data is transmitted by a transmission synchronization method such as synchronizing with a transmission clock.

In a system for centrally controlling a large number of devices arranged in a facility, a so-called wiring saving, in which the number of wirings is reduced, is widely implemented. Then, as a general method of the wiring saving, to replace the parallel connection directly connecting each of a plurality of devices provided on the controlled side to the control unit provided on the control side, it has been widely adopted a system wherein a master station and a plurality of remote stations having a conversion function of a parallel signal and a serial signal, respectively connected to the control unit and a plurality of devices, and, the master station and a plurality of remote stations perform transmitting and receiving data by using a serial signal via a common transmission line between a plurality of remote stations. Further, as a method of transmitting and receiving data by using a serial signal via a common transmission line, a transmission synchronization method such as synchronizing with a transmission clock is often adopted.

However, when the wiring saving is realized, in a state wherein a large number of remote stations are connected, if the error of the transmission data in the remote station cannot be specified on the control unit side, it is necessary to check each of the remote stations that are far from the control unit, and it takes a large number of man-hours to detect the error of the transmission data in the remote station.

Therefore, the applicant of the present invention proposes a control and monitoring signal transmission system disclosed in U.S. Pat. No. 5,738,498 as a system wherein the presence or absence of an error in transmission data can be confirmed by a master station without decreasing the transmission rate of transmission data in a transmission synchronization system.

In the above system, in the transmission procedure, a management data range different from control and monitoring data ranges composed of transmission control data for a plurality of remote stations and transmission monitoring data superimposed from the remote stations is provided, via the management data range, the master station designates an arbitrary remote station, and the designated remote station transmits either or both of a control transmission check data and a monitoring transmission check data to the master station, which the control transmission check data is basing on all of the transmission control data extracted by the designated remote station and converted by a predetermined rule, and which the monitoring transmission check data is basing on all of the transmission monitoring data extracted by the designated remote station and converted by a predetermined rule.

Then, the master station compares the data with a control transmission check data basing on all of the transmission control data and converted by the same rule as the remote station at the master station or a monitoring transmission check data basing on all of the transmission monitoring data and converted by the same rule as the remote station at the master station to check the presence or absence of an error in the transmission data.

PRIOR ART DOCUMENTS

Patent Document

[Patent Document 1] U.S. Pat. No. 5,738,498

SUMMARY OF THE INVENTION

Problem to be Solved by the Invention

However, a general remote station used in a system employing a transmission synchronization scheme has only a function of transmitting information acquired by the own station, or only a function of acquiring only information transmitted to the own station and outputting an instruction signal to an output unit, and does not have a function of extracting all information transmitted from other stations or information transmitted to other stations. Therefore, in order to implement a conventional method of checking the presence or absence of an error in transmission data using the control transmission check data and the monitoring transmission check data, a large-scale system change for exchanging all remote stations has been required.

Further, in the conventional method of confirming the presence or absence of an error in transmission data using the control transmission check data and the monitoring transmission check data, the data range for designating the remote station for transmitting the check data is required in addition to the data range for transmitting the check data itself, so that the transmission procedure is increased and the required transmission rate cannot be obtained in some cases.

Therefore, an object of the present invention is to provide a control and monitoring signal transmission system wherein the transmission synchronization method is adopted, even in a system wherein remote stations not having a function of extracting information output to the transmission signal is used, without a large-scale system change for exchanging all the remote stations, without accompanied by a significant increase in the transmission procedure, the master station can confirm the presence or absence of an error in the transmission data.

Means for Solving the Problems

In the control and monitoring signal transmission system according to the present invention, a master station that transmits and receives data to and from a control unit, a plurality of remote stations that transmit and receive data to and from the master station by a transmission synchronization method via a common transmission line, and a terminator that is connected to the common transmission line are provided, and transmitting and receiving data between the master station and the remote stations is performed by superimposing data on a frame repeatedly transmitted from the master station. The terminator extracts all of the monitoring data transmitted from the remote stations, converts the monitoring data into check data by a predetermined rule, and superimposes the check data on a check data output range provided at the end of the frame. The master station converts all of the monitoring data transmitted from the remote stations into the comparison data by the same rule as the terminator, and determines that there is an error in the transmission data when the comparison result of the check data and the comparison data is inconsistent between the check data and the comparison data.

The next frame of the frame wherein the monitoring data was superimposed is used as a confirmation frame, content in the confirmation frame is same as the monitoring data, the master station uses the confirmation frame for transmission of control data as a normal frame when the check data and the comparison data are matched, and when the check data and the comparison data are not matched, it may be determined that there is an error in the transmission data if the monitoring data superimposed on the confirmation frame and the monitoring data superimposed on the previous frame are not matched.

The terminator may transmit data indicating that the voltage of the common transmission line is decreasing to the master station.

The monitoring data may be indicated by a first potential higher than a predetermined threshold value and a second potential lower than the threshold value, and the terminator may maintain a voltage level of the first potential above the threshold value.

The monitoring data may be indicated by a first potential higher than a predetermined threshold value and a second potential lower than the threshold value, and the terminator may maintain a voltage level of the second potential below the threshold value.

Effect of the Invention

According to the present invention, because of functions of extracting all of the monitoring data transmitted from the remote stations, converting to check data basing on it by a predetermined rule, and superimposing the check data to the check data output range provided at the end of the frame repeatedly transmitted from the master station, are provided to the terminator that is usually provide in the system wherein a transmission synchronization scheme is adopted, even in a system wherein a transmission synchronization scheme is adopted, and remote stations not having a function of extracting the information transmitted from the other stations or information transmitted to the other stations are used, without a large-scale system change for exchanging all the remote stations, it is possible to confirm the presence or absence of an error of the transmission data using the check data.

Moreover, since the terminator is specified as a single transmission source of the check data, a data range for designating a remote station for transmitting the check data is not required, and a data range for transmitting the check data itself can be suppressed to a minimum required range. That is, the presence or absence of an error in the transmission data can be confirmed without a significant increase in the transmission procedure.

In the conventional method of checking the presence or absence of an error in transmission data using control transmission check data or monitoring transmission check data, a plurality of remote stations are checked. On the other hand, according to the present invention, the next frame of the frame wherein the monitoring data is superimposed is the frame for confirmation, content in the frame for confirmation is same as the monitoring data, when the check data and the comparison data are not matched, by comparing the monitoring data superimposed on the frame for confirmation and the monitoring data superimposed on the previous frame, the determination obtained by not confirming the plurality of remote stations can be secured that it maintains accurate.

In addition, since the terminator is disposed at a position farther from the master station than any of the remote stations, it is highly likely that the voltage drop of the transmission line becomes larger than that of any of the remote stations. Therefore, the terminator transmits data indicating that the voltage of the common transmission line is lowered to the master station, so that it is possible to confirm the presence or absence of an error in the transmission data caused by the voltage drop of the transmission line.

Further, when the monitoring data is indicated by a first potential higher than the predetermined threshold value and a second potential lower than the threshold value, if the terminator is to maintain the voltage level of the first potential in a state higher than the threshold value, or to maintain the voltage level of the second potential in a state lower than the threshold value, it is possible to prevent the error of the transmission data due to the variation of the voltage level, and if there is an error in the transmission data, it can be determined that there is a possibility that an event different from the variation of the voltage level, for example, the blunt of the waveform or the noise is causing the error.

DESCRIPTION OF EMBODIMENTS

Embodiments of a control and monitoring signal transmission system according to the present invention will be described.

Figure 1:
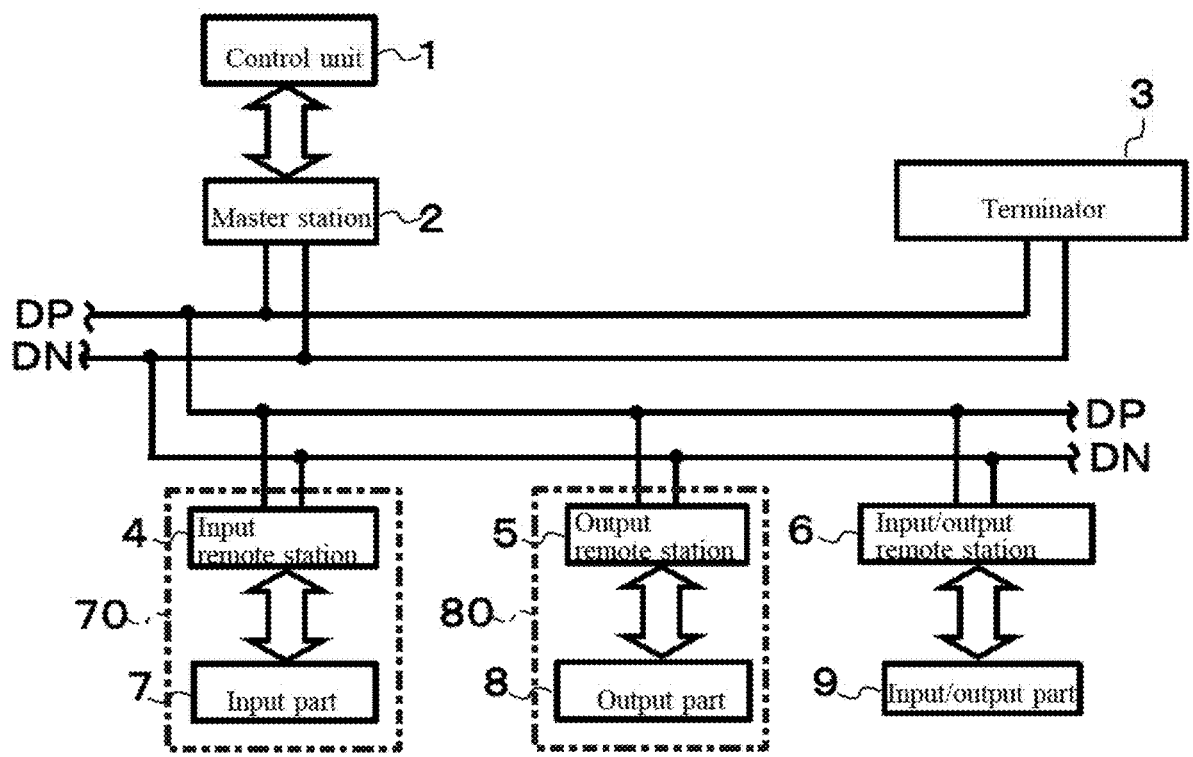
FIG. 1 It is a system configuration diagram of an embodiment of a control and monitoring signal transmission system according to the present invention.

This control and monitoring signal transmission system is for centrally controlling a large number of devices arranged in a facility such as a factory in a control unit. As illustrated in FIG. 1, it is configured with a master station 2 connected to a control unit 1 and a common-data-signal line DP, DN (hereinafter referred to as a transmission line), a plurality of input remote stations 4, output remote stations 5 and input/output remote stations 6 arranged in a facility to be controlled and connected to a transmission line, and, a terminator 3 connected to the transmission line. In FIG. 1, for convenience of illustration, each remote station is shown one by one, but the type and numbers of remote stations connected to the transmission line are not limited.

The input part 7 to which the input remote station 4 is connected, the output part 8 to which the output remote station 5 is connected, and the input/output part 9 to which the input/output remote station 6 is connected are devices arranged in a facility to be controlled.

Examples of the input part 7 include, but are not limited to, a reed switch, a micro switch, a push button switch, a photoelectric switch, and various other sensors.

Examples of the output part 8 include, but are not limited to, an actuator, a (stepping) motor, a solenoid, a solenoid valve, a relay, a thyristor, and a lamp.

The input/output part 9 is a device having the functions of both the input part 7 and the output part 8. For example, a device such as a temperature controller, a timer, and a counter that has both a function of transmitting information to the master station 2 and a function of performing an output operation based on data transmitted from the master station 2 can be cited.

The input part 7 may be an input part integrated remote station 70 integrated with the input remote station 4. Further, the output unit 8 may be an output part integrated remote station 80 integrated with the output remote station 5.

The control unit 1 includes a management determining part 11 having an arithmetic processing function and an input/output unit 12. The management determining part 11 receives data from the master station 2 via the input/output unit 12, and performs necessary arithmetic processing based on a program stored therein.

<Master Station Configuration>

Figure 2:
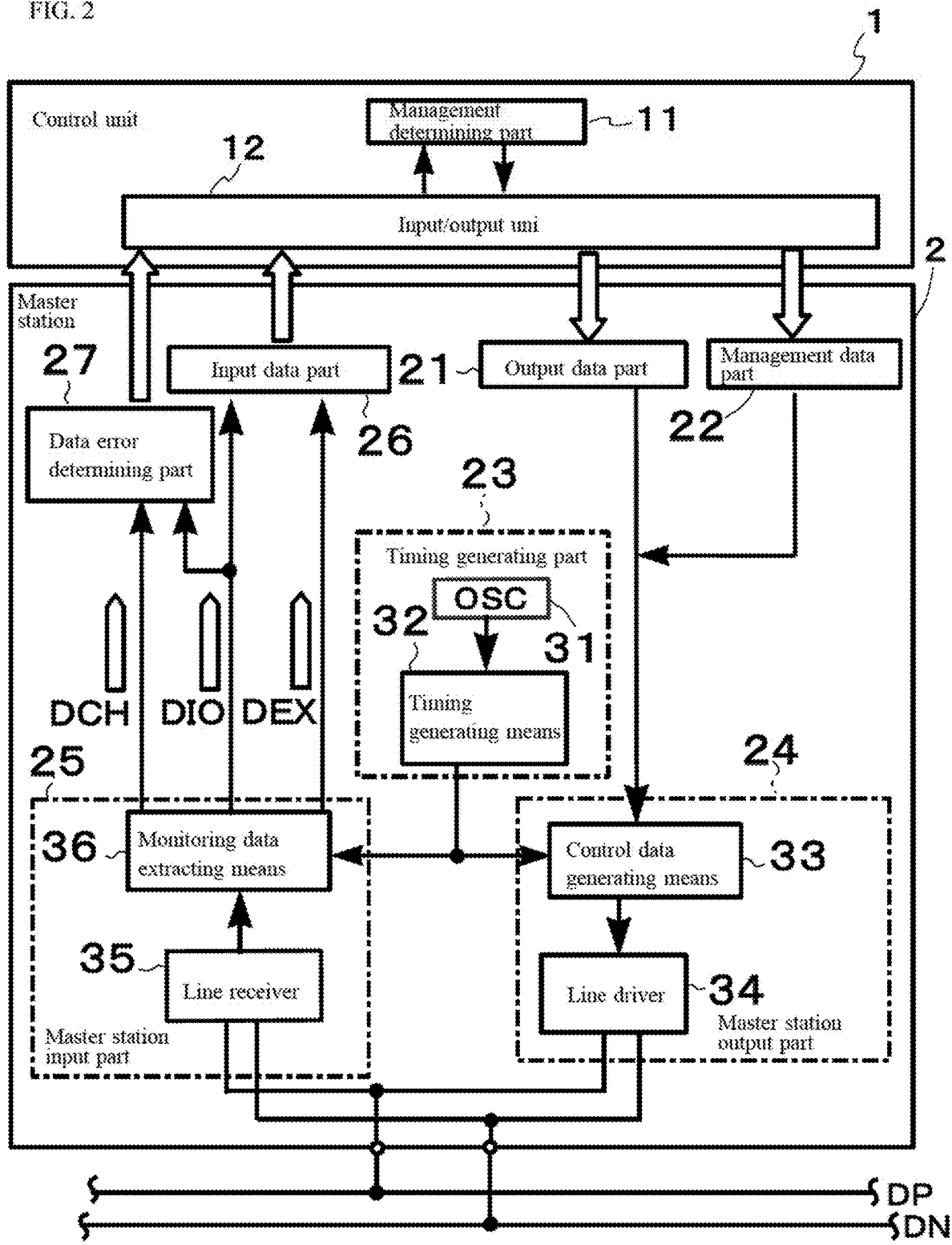
FIG. 2 It is a functional block diagram of the master station.

The master station 2 is connected to a transmission line, and as shown in FIG. 2, includes an output data part 21, a management data part 22, a timing generating part 23, a master station output part 24, a master station input part 25, an input data part 26, and a data error determining part 27. Then, the control data is output as it is included in the voltage clock signal having a predetermined cycle and duty ratio, and the monitoring data output from the input remote station 4, the output remote station 5 and the input/output remote station 6 in a period between the clock voltage ranges of the voltage clock signal is extracted, and is output to the input/output unit 12 of the control unit 1. Further, by using the check data, the presence or absence of an error in the transmission data is determined, and the determination result is output to the input/output unit 12 of the control unit.

The output data part 21 passes the data received from the control unit 1 as serial data to the master station output part 24.

Basing on the data received from the control unit 1, the management data part 22 passes data necessary for instruction by a management control data range to the remote station, as serial data, to the master station output part 24, which range is to be described later.

The timing generating part 23 includes an oscillation circuit (OSC) 31 and timing generating means 32, timing generating means 32 generates a timing clock of the system basing on the oscillation circuit (OSC) 31 and passes the generated timing clock to the master station output part 24 and the master station input part 25.

The master station output part 24 includes a control data generating means 33 and a line driver 34. The control data generating means 33 outputs a voltage clock signal including control data to the transmission line via the line driver 34 basing on the data received from the output data part 21 and the timing clock received from the timing generating part 23.

Figure 3:
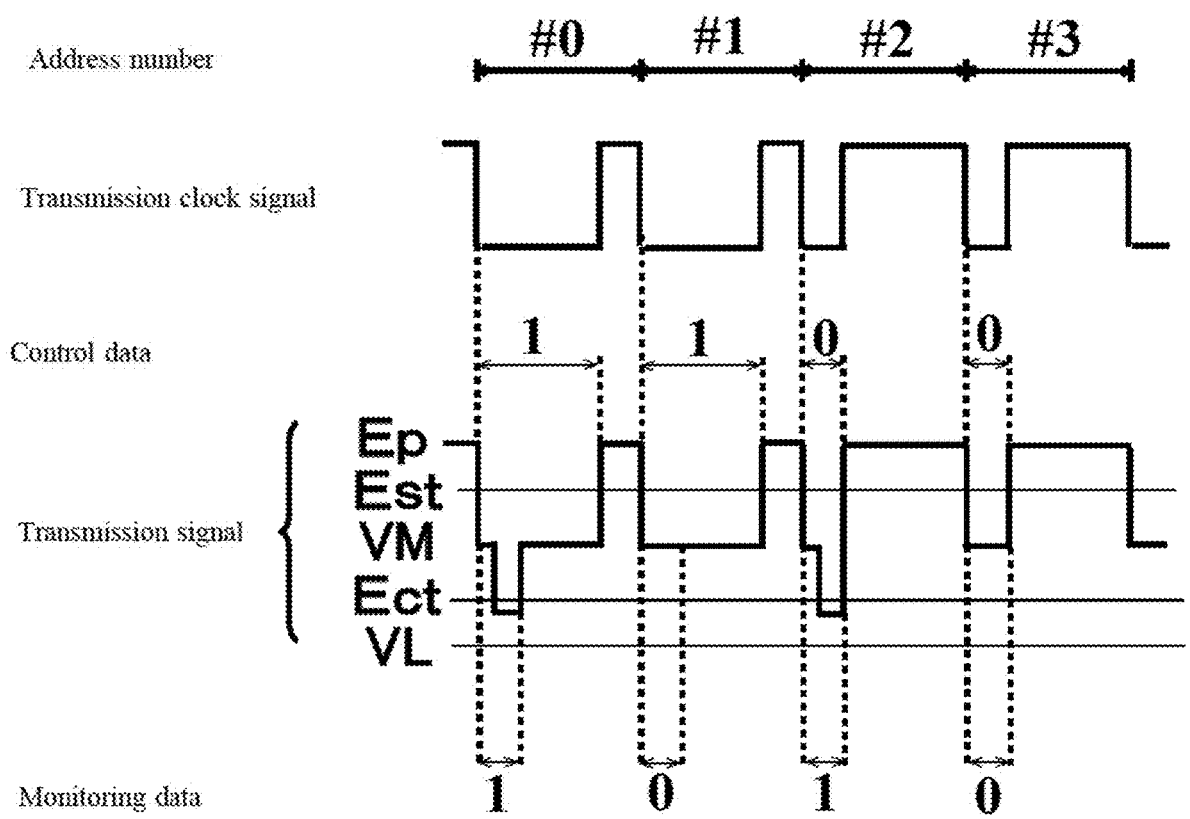
FIG. 3 It is a time chart of a transmission signal.

As shown in FIG. 3, the voltage clock signal includes a plurality of clock voltage ranges continuing in line wherein a voltage level Ep higher than the threshold Est is maintained for a predetermined period of time. In this embodiment, the voltage-level Ep is set to +24V.

The clock voltage range is not limited as long as it functions as a synchronous clock, and can be appropriately determined according to the use environment and the use state. For example, it may be a negative voltage being maintained lower than the ground level for a predetermined period of time.

In the range (hereinafter, referred to as "a data I/O range") between the clock voltage ranges, the data value is indicated by a voltage level lower than the voltage level Ep of the clock voltage range.

In this embodiment, the voltage potential VL (the second voltage potential) lower than the threshold value Ect is set as the voltage level to indicate the logical data value "1", and the voltage potential VM (the first voltage potential) higher than the threshold value Ect is set as the voltage level to indicate the logical data value "0". However, the voltage level indicating the data value may be appropriately determined according to the use environment or the use state as long as it is distinguished from the clock voltage. It may be a voltage level higher than the voltage level Ep of the clock voltage ranges. The same applies even if the voltage level Ep in the clock voltage ranges is a negative voltage lower than the ground level.

Further, in this embodiment, the threshold Ect is set (approximately 6V) between 10V and the ground level, but the potential thereof is not limited, and may be set according to the use state or the use environment. The correspondence relationship between the voltage level to indicate the data value and the logical data value is not limited, and can be appropriately determined according to the use environment and the use state.

In the data I/O range, the data is also indicated by the duration of the data I/O range. In this embodiment, when the period from the rising edge of the clock voltage range to the rising edge of the next arriving clock voltage range is set as one cycle to of the voltage clock signal, the time of the data I/O range (¾)t0 indicates logical data "0" and the time (¼)t0 indicates logical data "1". As long as the time corresponds to the value of the control data input from the control unit 1, the length thereof is not limited and may be appropriately determined. However, from the viewpoint of the stability of the clock function, it is preferable to increase the duty ratio.

Figure 4:
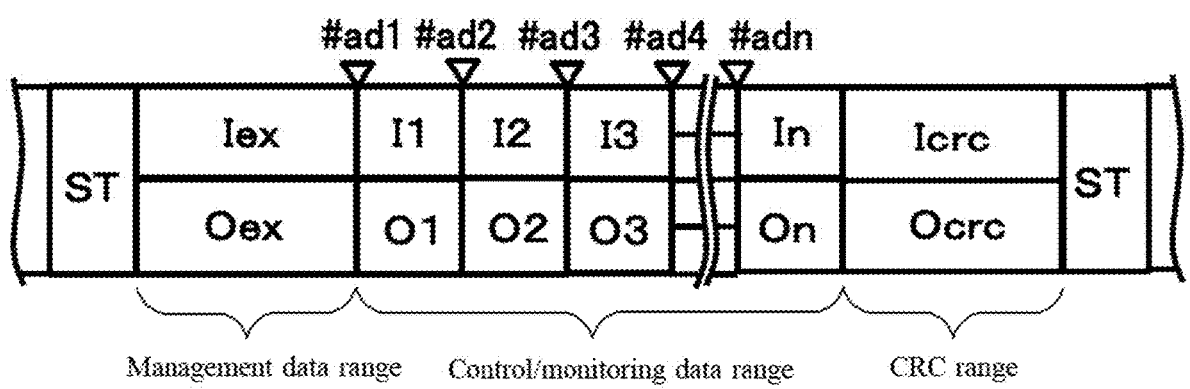
FIG. 4 It is a schematic diagram showing a transmission procedure of the transmission signal.

The voltage clock signal is repeatedly transmitted from the master station 2 using a series of lengths of a predetermined number of clock voltage ranges as one frame. As shown in FIG. 4, a management data range, a control/monitoring data range, and a check data outputting range (referred to as a "CRC range" in FIG. 4) are provided in one frame.

Further, a start signal ST wherein the voltage level Ep of the clock voltage range is maintained for a longer period than the clock voltage range is transmitted to the head of the frame, and the frames are separated from each other. The length of the start signal ST is not limited as long as it can be distinguished from the clock voltage range, and can be appropriately determined in view of the use conditions and the like.

In the control/monitoring data range, a predetermined range is allocated to each of the input remote station 4, the output remote station 5, and the input/output remote station 6 (hereinafter, these may be collectively referred to as "remote stations 4, 5, and 6"). Then, the control data for the output remote station 5 and the input/output remote station 6 from the master station 2 is superimposed on the range allocated to the target remote station, or the monitoring data for the master station 2 from the input remote station 4 and the input/output remote station 6 is superimposed on the range allocated to the remote station transmitting the monitoring data, so that the control/monitoring data range is used for transmitting and receiving the steady data between the master station 2 and the remote stations 4, 5, and 6.

Note that the monitoring data from the input remote station 4 and the input/output remote station 6 is superimposed on the next frame of the frame wherein the monitoring data is superimposed, that is, the same content is also superimposed on the confirmation frame.

The management data range is used for transmitting and receiving non-stationary data that cannot be transmitted and received by using the control/monitoring data range.

The check data for the master station 2 from the terminator 3 is superimposed on the check data output range. In this embodiment, since CRC is adopted as the check data, the check data output range is referred to as a "CRC range" in the following explanation. Note that the check data is not limited to CRC, and other known frame check sequences may be used depending on the use conditions and the like.

The master station input part 25 includes a line receiver 35 and a monitoring data extracting means 36. The line receiver 35 receives the voltage clock signal from the transmission line, performs waveform shaping, and passes it to the monitoring data extracting means 36.

The monitoring data extracting means 36 obtains timing for extracting a data value using the timing clock delivered from the timing generating part 23, and extracts data basing on the digital value of the voltage level of the voltage clock signal delivered from the line receiver 35. Then, it passes the steady data DIO superimposed on the control/monitoring data range to the input data part 26 and the data error determining part 27. Further, it passes the management data DEX superimposed on the management data range to the input data part 26. Furthermore, it passes the check data DHC of CRC range to the data error determining part 27.

The input data part 26 converts the serial input data received from the monitoring data extracting means 36 into parallel data, and outputs the parallel data as monitoring data and management monitoring data to the input/output unit 12 of the control unit 1.

The data error determining part 27 compares the comparison data obtained basing on the steady data DIO received from the monitoring data extracting means 36 to the check data DCH also received from the monitoring data extracting means 36. Then, to the input/output unit 12 of the control unit 1, as a determination result, it output that the transmission data is normal in the case wherein these data are matched, and that there is an error in the transmission data in the case wherein these data are not matched.

Note that the determination result that there is an error in the transmission data is fixed following inconsistency of the check data DCH and the comparison data, when the monitoring data superimposed on the frame wherein those data do not match and the monitoring data superimposed on the confirmation frame that is the next frame also does not match.

On the other hand, when the determination result that the transmission data is normal is obtained, the comparison using the confirmation frame is not necessary, so that the frame that should be the confirmation frame when the check data DCH and the comparison data are not matched can be used for outputting the control data from the master station 2 to the output remote station 5 and the input/output remote station 6. Therefore, as long as the transmission data is normal, data can be transmitted in each frame.

<Input Remote Station Configuration>

Figure 5:
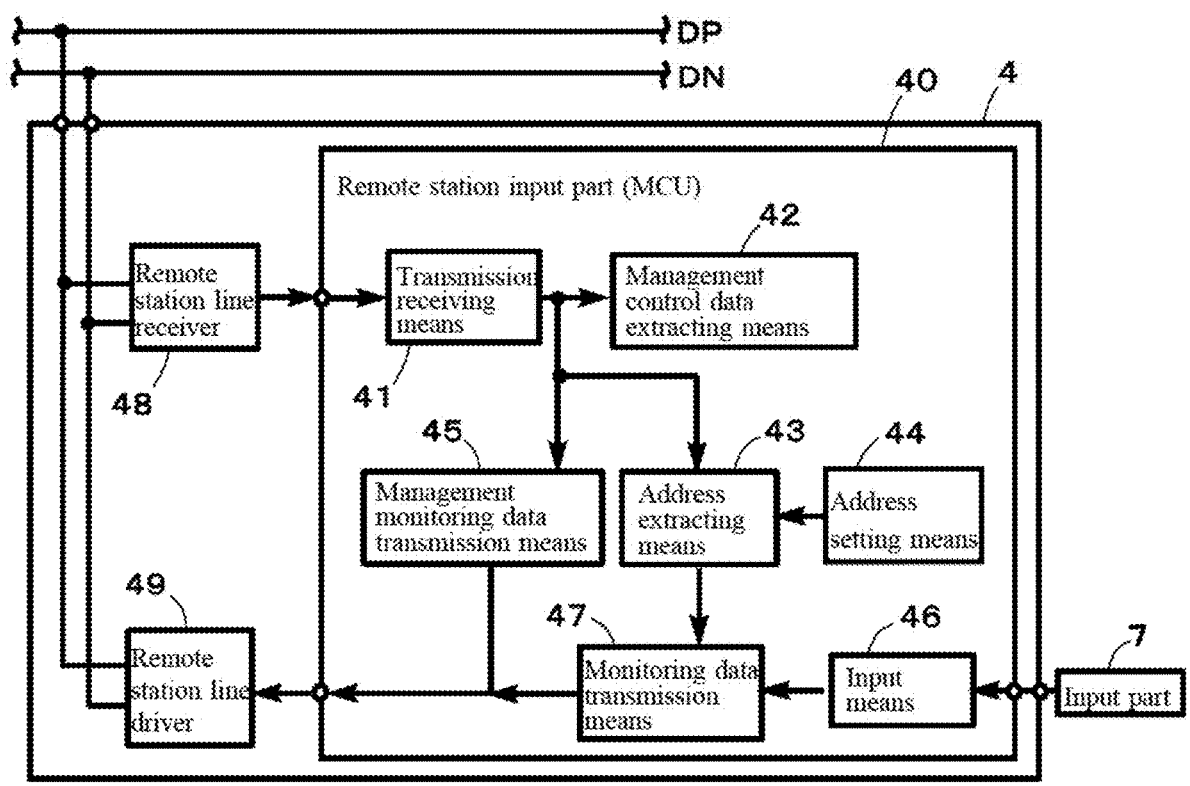
FIG. 5 It is a functional block diagram of the input remote station.

As shown in FIG. 5, the input remote station 4 includes a remote station input part 40 for executing main arithmetic processing, and a remote station line receiver 48 and a remote station line driver 49 disposed between the remote station input part 40 and the transmission line, receives a voltage clock signal from the transmission line via the remote station line receiver 48, and outputs a monitoring signal to the transmission line via the remote station line driver 49.

The remote station input part 40 includes a transmission receiving means 41, a management control data extracting means 42, an address extracting means 43, an address setting means 44, a management monitoring data transmission means 45, an input means 46, and a monitoring data transmission means 47.

Incidentally, the input remote station 4 of this embodiment includes a MCU which is a microcomputer control unit as an internal circuit, and this MCU functions as the remote station input part 40.

The remote station line receiver 48 receives a voltage clock signal from the transmission line, performs waveform shaping, and passes the signal to the transmission receiving means 41.

The transmission receiving means 41 determines the voltage level comparing to the threshold Est and the threshold Ect, and passes the digital value of the voltage level of the voltage clock signal, which digital value is delivered from the remote station line receiver 48, to the management control data extracting means 42, to the address extracting means 43, and to the management monitoring data transmission means 45.

The management control data extracting means 42 determines the start signal ST basing on the digital value of the voltage level of the voltage clock signal. Then, the control data is extracted basing on the digital value of the voltage level of the data I/O range in the management data range, starting from the timing wherein the start signal ST ends (falling edge in this embodiment). The extracted management data is passed over to a not shown processing means wherein processes basing on the data are executed.

The address extracting means 43 determines the start signal ST basing on the digital value of the voltage level of the voltage clock signal, and counts the clock voltage ranges starting from the timing wherein the start signal ST ends (falling edge in this embodiment). Then, a timing wherein the count value matches the own station address data set by the address setting means 44 is obtained. Note that this timing is a timing wherein the data range allocated to the own station in the control/monitoring data range (hereinafter, referred to as "own station range") starts (hereinafter, referred to as "own station range start timing").

Then, the address extracting means 43 having obtained the own station range start timing enables the monitoring data transmission means 47. Further, in the case where the own station range is composed of a plurality of data I/O range, the monitoring data transmission means 47 is enabled every time the data I/O range appears until the own station range ends.

The management monitoring data transmission means 45 determines the start signal ST basing on the digital value of the voltage level of the voltage clock signal. Then, starting from the timing wherein the start signal ST ends, it outputs a monitoring data required in the management data range.

Note that the monitoring data output from the management monitoring data transmission means 45 is transmitted only when data to be transmitted to the master station 2 is delivered from a not shown processing part.

The input means 46 passes the data basing on the input from the input part 7 to the monitoring data transmission means 47.

When enabled by the address extracting means 43, the monitoring data transmission means 47 outputs the data delivered from the input means 46 via the remote station line driver 49 as a monitoring data.

<Output Remote Station Configuration>

Figure 6:
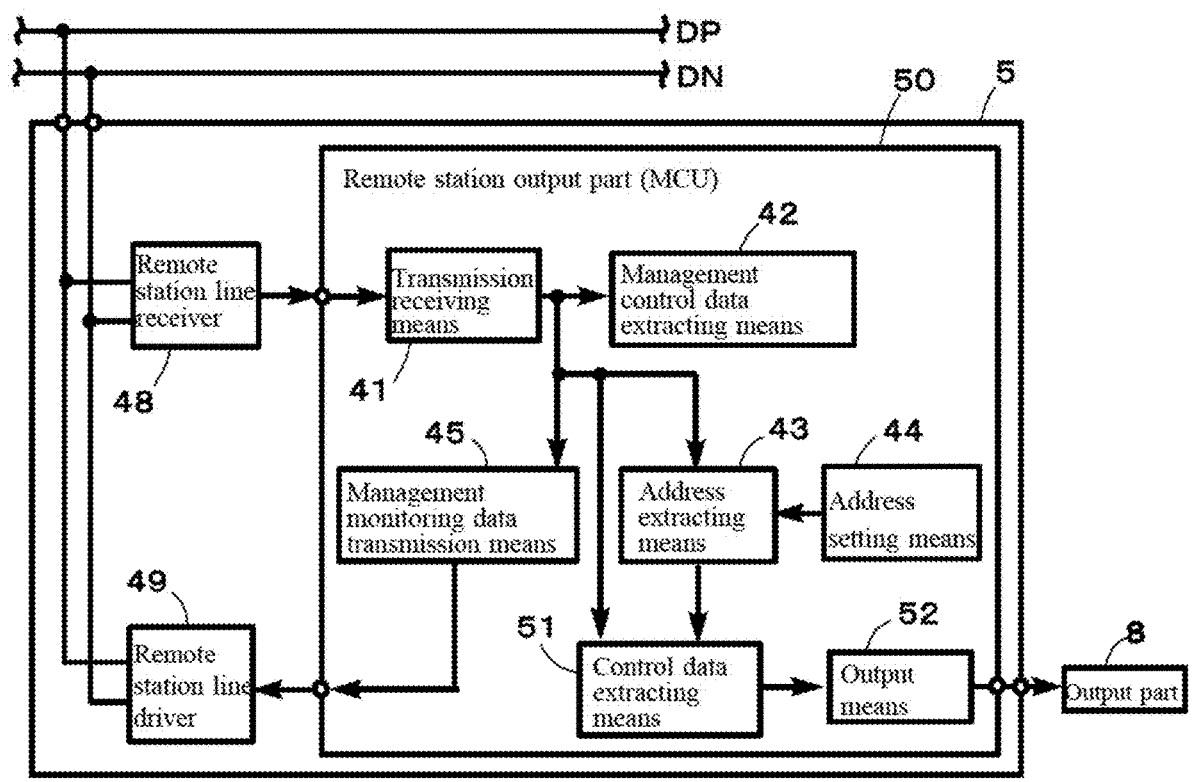
FIG. 6 It is a functional block diagram of the output remote station.

As shown in FIG. 6, the output remote station 5 includes a remote station output part 50 for executing main arithmetic processing, and a remote station line receiver 48 and a remote station line driver 49 disposed between the remote station output part 50 and the transmission line, receives a voltage clock signal from the transmission line via the remote station line receiver 48, and outputs information basing on a control data to the output part 8 for operating or stopping the output part 8. Further, in case wherein receiving and sending data using management range are required, it sends the monitoring data via the remote station line driver 49. In FIG. 6, substantially the same parts as those of the input remote station 4 are denoted by the same reference numerals, and the description thereof will be simplified or omitted.

The remote station output part 50 includes a transmission receiving means 41, a management control data extracting means 42, an address extracting means 43, an address setting means 44, a management monitoring data transmission means 45, a control data extracting means 51, and an output means 52.

Similarly to the input remote station 4, the output remote station 5 of this embodiment also includes a MCU which is a microcomputer control unit as an internal circuit, and this MCU functions as the remote station output part 50.

The transmission receiving means 41 of the output remote station 5 passes the digital value of the voltage level of the voltage clock signal delivered from the remote station line receiver 48 to the management control data extracting means 42, the address extracting means 43, the management monitoring data transmission means 45, and the control data extracting means 51.

The address extracting means 43 of the output remote station 5 obtains the own station range start timing by counting the clock voltage range starting from the timing wherein the start signal ST ends.

Then, the address extracting means 43 having obtained the own station range start timing enables the control data extracting means 51. Further, in the case where the own station range is composed of a plurality of data I/O ranges, the control data extracting means 51 is enabled for the period of the data I/O range every time the data I/O range appears until the own station range ends.

When enabled by the address extracting means 43, the control data extracting means 51 extracts the control data basing on the digital value of the voltage level of the voltage clock signal delivered from the transmission receiving means 41, and passes the control data to the output means 52.

The output means 52 outputs information basing on the control data delivered from the control data extracting means 51 to the output part 8, and operates or stops the output part 8.

<Input/Output Remote Station Configuration>

The input/output remote station 6 has the functions of both the input remote station 4 and the output remote station 5, and has a remote station input/output part having both the configurations of the remote station input part 40 and the remote station output part 50, then the configuration being substantially the same as the remote station input part 40 and the remote station output part 50, illustration and description thereof are omitted.

<Terminator Configuration>

Figure 7:
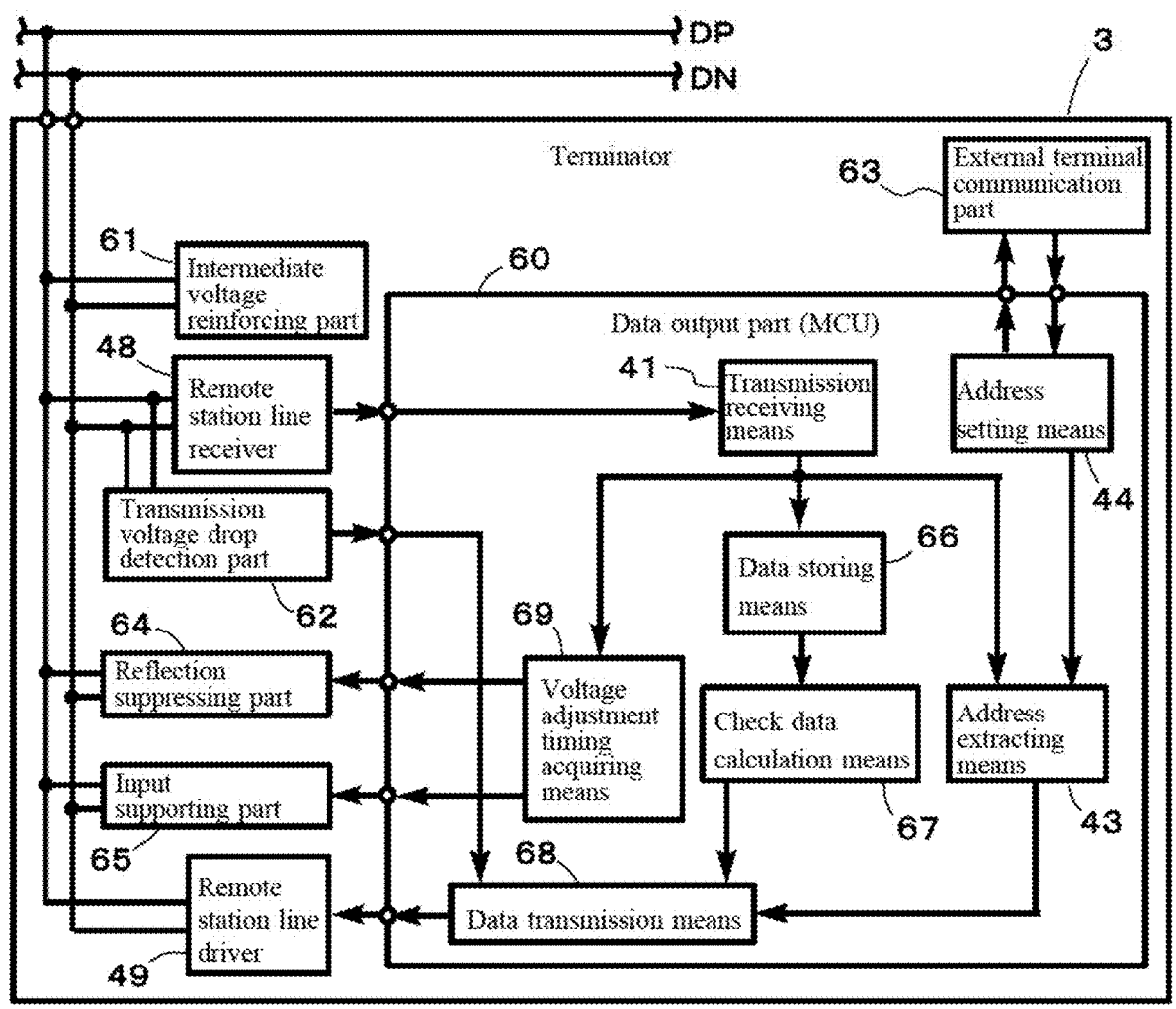
FIG. 7 It is a functional block diagram of the terminator.

As shown in FIG. 7, the terminator 3 includes a remote station line receiver 48, a remote station line driver 49, a data output part 60, an intermediate voltage reinforcing part 61, a transmission voltage drop detection part 62, an external terminal communication part 63, a reflection suppressing part 64, and an input supporting part 65. In FIG. 7, substantially the same parts as those of the input remote station 4 are denoted by the same reference numerals, and the description thereof will be simplified or omitted.

The intermediate voltage reinforcing part 61 reinforces a voltage level of the potential VM higher than the threshold Ect, which indicates a predetermined logical data value ("0" in this embodiment) in the data I/O range. This suppresses the occurrence of an error caused by a voltage level drop in the transmission line.

The transmission voltage drop detection part 62 detects that the voltage level of the transmission line has dropped to a predetermined state (16V in this embodiment), and passes data indicating the drop to the data output part 60.

As shown in FIG. 7, the data output part 60 includes a transmission receiving means 41, an address extracting means 43, an address setting means 44, a data storing means 66, a check data calculation means 67, and a data transmission means 68, and executes arithmetic processing for extracting all of the monitoring data transmitted from the input remote station 4 and the input/output remote station 6 and converting the data into check data according to a predetermined rule.

The data output part 60 also includes a voltage adjustment timing acquiring means 69, and performs voltage adjustment in the data I/O range in order to prevent errors in data transmission. The terminator 3 of this embodiment also includes a MCU that is a microcomputer control unit, similar to the remote stations 4, 5, and 6, and this MCU functions as the data output part 60.

The transmission receiving means 41 of the data output part 60 discriminates the voltage level from the threshold Est or the threshold Ect, and passes the digital value of the voltage level of the voltage clock signal delivered from the remote station line receiver 48 to the address extracting means 43, the data storing means 66, and the voltage adjustment timing acquiring means 69.

The address extracting means 43 of the data output part 60 determines the start signal ST basing on the digital value of the voltage level of the voltage clock signal, counts the clock voltage range starting from the timing wherein the start signal ST ends (falling edge in this embodiment), and obtains a timing wherein the count value matches the address data of CRC range set by the address setting means 44. Then, the address extracting means 43 having obtained the starting timing of CRC range enables the data transmission means 68.

The data storing means 66 extracts the monitoring data transmitted from the input remote station 4 and the input/output remote station 6 basing on the digital value of the voltage level of the voltage clock signal delivered from the transmission receiving means 41, and stores all the monitoring data. Then, when the size corresponding to all the monitoring data has been reached, all the data is passed to the check data calculation means 67.

The check data calculation means 67 converts the data passed from the data storing means 66 into check data according to a predetermined rule, and passes the check data to the data transmission means 68.

When enabled by the address extracting means 43, the data transmission means 68 transmits the data passed from the check data calculation means 67 as check data via the remote station line driver 49. When data indicating a voltage drop is transferred from the transmission voltage drop detection part 62, the data is also transmitted via the remote station line driver 49.

The voltage adjustment timing acquiring means 69 acquires the timing of the data I/O range and enables the reflection suppressing part 64 basing on the digital value of the voltage level of the voltage clock signal delivered from the transmission receiving means 41, and also acquires the timing wherein the potential VL is lower than the threshold Ect to enable the input supporting part 65.

The external terminal communication part 63 communicates with an external terminal device (not shown) separate from the terminator 3 to exchange data. When the address of CRC range is set, the address data transmitted from the external terminal device is passed to the address setting means 44, and when the external terminal device requests data provision, the data of the address setting means 44 is transmitted to the external terminal device.

When enabled by the voltage adjustment timing acquiring means 69, the reflection suppressing part 64 maintains the voltage level of the potential VM that should be higher than the threshold value Ect in the state being above the threshold value Ect, and suppresses the variation of the potential VM.

When enabled by the voltage adjustment timing acquiring means 69, the input supporting part 65 suppresses an increase in the voltage level that occurs when the number of the remote stations 4, 5, and 6 increases, and maintains the voltage level of the potential VL that should be lower than the threshold value Ect in the state being below the threshold value Ect.

DESCRIPTION OF REFERENCE NUMERALS

1 Control unit
2 Master station
3 Terminator
4 Input remote station
5 Output remote station
6 Input/output remote station
7 Input part
8 Output part
9 Input/output part
11 Management determining part
12 Input/output unit
21 Output data part
22 Management data part
23 Timing generating part
24 Master station output part
25 Master station input part
26 Input data part
31 Oscillation circuit (OSC)
32 Timing generating means
33 Control data generating means
34 Line driver
35 Line receiver
36 Monitoring data extracting means
40 Remote station input part
41 Transmission receiving means
42 Management control data extracting means
43 Address extracting means
44 Address setting means
45 Management monitoring data transmission means
46 Input means
47 Monitoring data transmission means
48 Remote station line receiver
49 Remote station line driver
50 Remote station output part
51 Control data extracting means
52 Output means
60 Data output part
61 Intermediate voltage reinforcing part
62 Transmission voltage drop detection part
63 External terminal communication part
64 Reflection suppressing part
65 Input supporting part
66 Data storing means
67 Check data calculation means
68 Data transmission means
69 Voltage adjustment timing acquiring means
70 Input part integrated remote station
80 Output part integrated remote station

What is claimed is:

1. A control and monitoring signal transmission system comprising a master station that transmits and receives data to and from a control part, a plurality of remote stations that transmit and receive data to and from the master station by a transmission synchronization method via a common transmission line, and a terminator that is connected to the common transmission line, wherein:
   transmitting and receiving data between the master station and the remote stations is performed by superimposing data on a frame repeatedly transmitted from the master station,
   the terminator extracts all of the monitoring data transmitted from the remote station, converts the monitoring data into check data by a predetermined rule, and superimposes the check data on a check data output range provided at the end of the frame,
   the master station converts all of the monitoring data transmitted from the remote stations into the comparison data by the same rule as the terminator, and determines that there is an error in the transmission data when the comparison result of the check data and the comparison data is inconsistent between the check data and the comparison data.

2. The control and monitoring signal transmission system according to claim 1, wherein the next frame of the frame wherein the monitoring data was superimposed is used as a confirmation frame, content in the confirmation frame is same as the monitoring data, the master station uses the confirmation frame for transmission of control data as a normal frame when the check data and the comparison data are matched, and when the check data and the comparison data are not matched, it is determined that there is an error in the transmission data if the monitoring data superimposed on the confirmation frame and the monitoring data superimposed on the previous frame are not matched.

3. The control and monitoring signal transmission system according to claim 1, wherein the terminator transmits data indicating that the voltage of the common transmission line is decreasing to the master station.

4. The control and monitoring signal transmission system according to claim 1, wherein the monitoring data is indicated by a first potential higher than a predetermined threshold value and a second potential lower than the threshold value, and the terminator maintains a voltage level of the first potential above the threshold value.

5. The control and monitoring signal transmission system according to claim 1, wherein the monitoring data is indicated by a first potential higher than a predetermined threshold old value and a second potential lower than the threshold value, and the terminator maintains a voltage level of the second potential below the threshold value.

\* \* \* \* \*